US012621535B2

(12) United States Patent
Sun

(10) Patent No.: US 12,621,535 B2
(45) Date of Patent: May 5, 2026

(54) BULLET-SCREEN COMMENT PROCESSING METHOD AND SYSTEM

(71) Applicant: SHANGHAI BILIBILI TECHNOLOGY CO., LTD., Shanghai (CN)

(72) Inventor: Jiaqi Sun, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/465,075

(22) Filed: Sep. 11, 2023

(65) Prior Publication Data

US 2024/0171827 A1    May 23, 2024

(51) Int. Cl.
*H04N 21/488*          (2011.01)
(52) U.S. Cl.
CPC ................................. *H04N 21/488* (2013.01)
(58) Field of Classification Search
CPC .................................................... H04N 21/488
See application file for complete search history.

(56) References Cited

U.S. PATENT DOCUMENTS

2012/0198335 A1* 8/2012 Huang ................ G06F 16/9535
                                                            715/716
2016/0366466 A1* 12/2016 Shen ...................... G06Q 50/01

FOREIGN PATENT DOCUMENTS

| | | | | |
|---|---|---|---|---|
| CA | 3128540 A1 * | 2/2022 | ....... | G06F 16/24552 |
| CN | 105872593 A | 8/2016 | | |
| CN | 107613392 A | 1/2018 | | |
| CN | 107645686 A | 1/2018 | | |
| CN | 108965916 A | 12/2018 | | |
| CN | 113010702 A | 6/2021 | | |
| CN | 113316026 A | 8/2021 | | |
| CN | 115168700 A | 10/2022 | | |

OTHER PUBLICATIONS

First Office Action of the counterpart CN application No. 202211449707.1 (10 Pages).

* cited by examiner

*Primary Examiner* — Sumaiya A Chowdhury
(74) *Attorney, Agent, or Firm* — FisherBroyles, LLP

(57)                ABSTRACT

A bullet-screen comment processing method is provided. The method includes: evaluating, by using a model, bullet-screen comment information obtained from a bullet-screen comment database, and storing the bullet-screen comment information in a bullet-screen comment recall pool; and obtaining corresponding bullet-screen comment information from the bullet-screen comment recall pool based on a video identifier of a video viewed by a user of a client and a time period in which the user views the video, performing screening based on a feature algorithm, and displaying bullet-screen comment information obtained through screening on the client.

16 Claims, 13 Drawing Sheets

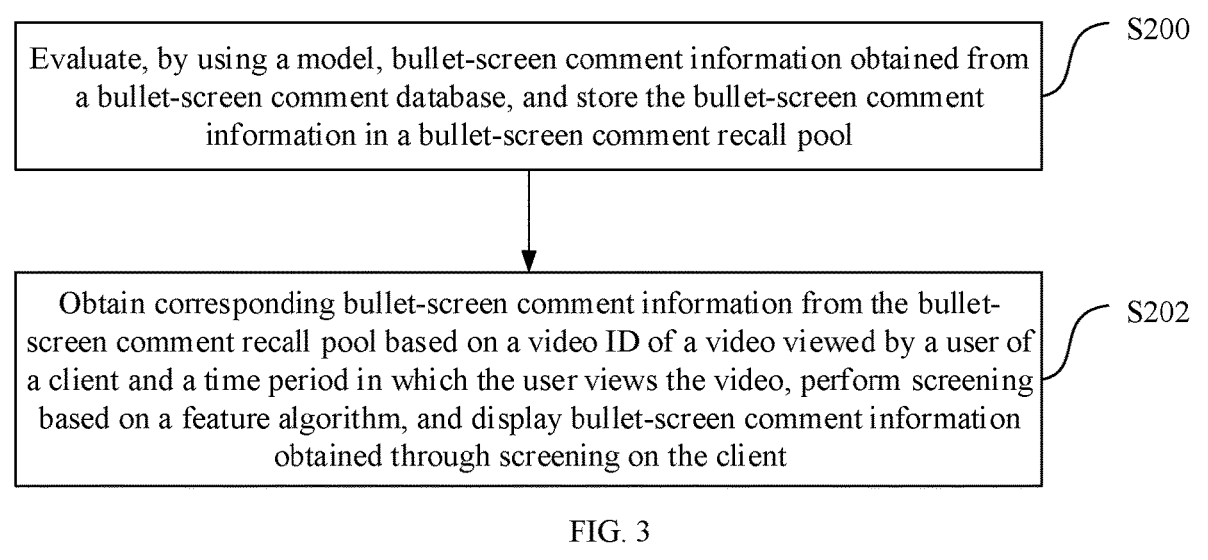

Evaluate, by using a model, bullet-screen comment information obtained from a bullet-screen comment database, and store the bullet-screen comment information in a bullet-screen comment recall pool — S200

Obtain corresponding bullet-screen comment information from the bullet-screen comment recall pool based on a video ID of a video viewed by a user of a client and a time period in which the user views the video, perform screening based on a feature algorithm, and display bullet-screen comment information obtained through screening on the client — S202

FIG. 3

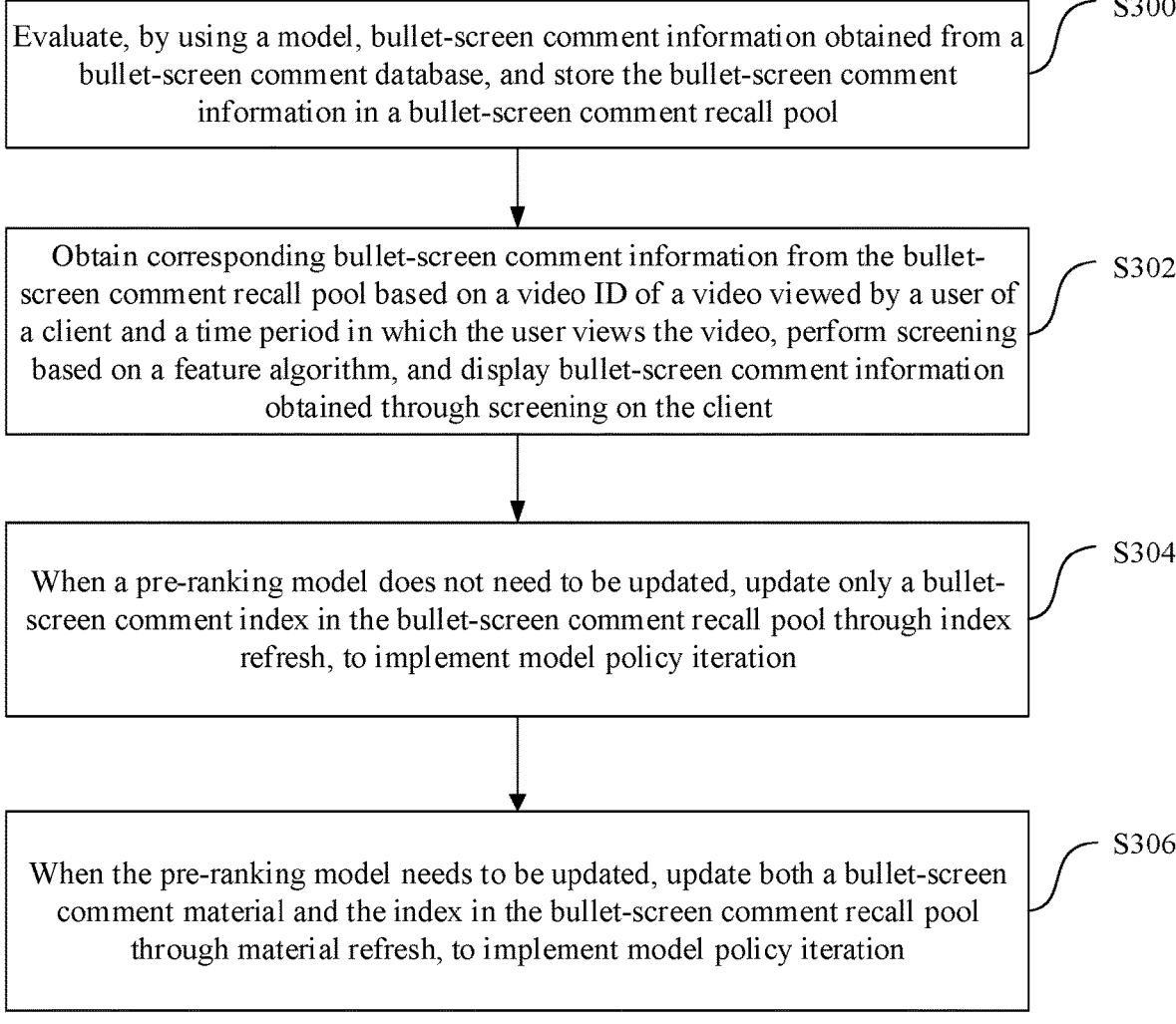

Evaluate, by using a model, bullet-screen comment information obtained from a bullet-screen comment database, and store the bullet-screen comment information in a bullet-screen comment recall pool

S300

Obtain corresponding bullet-screen comment information from the bullet-screen comment recall pool based on a video ID of a video viewed by a user of a client and a time period in which the user views the video, perform screening based on a feature algorithm, and display bullet-screen comment information obtained through screening on the client

S302

When a pre-ranking model does not need to be updated, update only a bullet-screen comment index in the bullet-screen comment recall pool through index refresh, to implement model policy iteration

S304

When the pre-ranking model needs to be updated, update both a bullet-screen comment material and the index in the bullet-screen comment recall pool through material refresh, to implement model policy iteration

| Field | score1 | score2 | ... | score16 | ... | version |
|-------|--------|--------|-----|---------|-----|---------|
| Model | Like model | Negative model | | Negative model (new) | | 2 → 3 |

BULLET-SCREEN COMMENT PROCESSING METHOD AND SYSTEM

CROSS-REFERENCE TO RELATED APPLICATIONS

This application claims priority to Chinese Patent Application No. 202211449707.1, filed on Nov. 18, 2022, the entire contents of which is hereby incorporated by reference in its entirety for all purposes.

TECHNICAL FIELD

This application relates to data processing technologies, and in particular, to bullet-screen comment processing.

BACKGROUND

With popularization and development of computer technologies, there are increasingly more video website users. Sending a bullet-screen comment for interaction while viewing a video gradually becomes a habit of the video website user. The bullet-screen comment is a comment caption that pops up during video viewing in a network, and can give viewers an illusion of "real-time interaction". In a current development phase of bullet-screen comment engineering construction, stability and high availability of a bullet-screen comment service need to be ensured in high-concurrency and hot scenarios, and to optimize video consumption experience, high-quality bullet-screen comment content is obtained through screening, and is displayed on a screen, and a personalized bullet-screen comment recommendation capability is built.

SUMMARY

A main objective of this application is to provide a bullet-screen comment processing method and system, an electronic apparatus, and a computer-readable storage medium.

An embodiment of this application provides a bullet-screen comment processing method. The method includes:

evaluating, by using a model, bullet-screen comment information obtained from a bullet-screen comment database, and storing the bullet-screen comment information in a bullet-screen comment recall pool; and obtaining corresponding bullet-screen comment information from the bullet-screen comment recall pool based on a video identifier of a video viewed by a user of a client and a time period in which the user views the video, performing screening based on a feature algorithm, and displaying bullet-screen comment information obtained through screening on the client.

Optionally, the bullet-screen comment recall pool includes a material pool and an index pool, the material pool is used to store a bullet-screen comment material that is basic data of a bullet-screen comment, and the index pool is used to store a bullet-screen comment index that is a model evaluation result of each bullet-screen comment corresponding to the material pool.

Optionally, the method further includes:

when a pre-ranking model does not need to be updated, updating only the bullet-screen comment index in the bullet-screen comment recall pool through index refresh, to implement model policy iteration.

Optionally, the method further includes:

when the pre-ranking model needs to be updated, updating both the bullet-screen comment material and the index in the bullet-screen comment recall pool through material refresh, to implement model policy iteration.

Optionally, the bullet-screen comment recall pool is a key-value database, and a recalled bullet-screen comment of a video in a first preset time period is stored in a value corresponding to a key.

Optionally, the material pool and the index pool are separately stored in the bullet-screen comment recall pool by using different keys, and data consistency is ensured by using a Redis segment lock.

Optionally, the evaluating, by using a model, bullet-screen comment information obtained from a bullet-screen comment database, and storing the bullet-screen comment information in a bullet-screen comment recall pool includes:

obtaining a bullet-screen comment material from the bullet-screen comment database, and evaluating each bullet-screen comment by using a pre-ranking model;

aggregating all bullet-screen comment materials in a second preset time period, and performing ranking and elimination on all bullet-screen comments in the second preset time period based on an evaluation result;

evaluating an uneliminated bullet-screen comment by using all models, and obtaining a bullet-screen comment index based on an evaluation result; and respectively storing a material list and an index list of the uneliminated bullet-screen comment in the material pool and the index pool.

Optionally, the time period is determined based on a video playing time point at which the user currently views the video and a segment size dynamically delivered by a server based on an application scenario.

Optionally, the performing screening based on a feature algorithm includes:

establishing ranking logic for personalized recommendation based on a preset feature algorithm that includes a user feature and a video feature, evaluating a corresponding bullet-screen comment by using all models, then performing ranking and extraction based on an evaluation result, and returning a recommendation result.

Optionally, the index refresh includes:

obtaining a highly hot video list and a real-time incremental video list;

evaluating bullet-screen comments corresponding to the highly hot video list and the real-time incremental video list by using all models; and obtaining a new index based on an evaluation result, and updating the new index to the bullet-screen comment recall pool.

Optionally, the material refresh includes:

obtaining a full bullet-screen comment and a real-time incremental bullet-screen comment;

evaluating the full bullet-screen comment and the real-time incremental bullet-screen comment by using the pre-ranking model;

performing ranking and elimination on a bullet-screen comment based on an evaluation result, and evaluating an uneliminated bullet-screen comment by using all models, to obtain a new index; and updating a material and the new index of the uneliminated bullet-screen comment to the bullet-screen comment recall pool.

In addition, an embodiment of this application further provides a bullet-screen comment processing system. The system includes:

a recall means, configured to: evaluate, by using a model, bullet-screen comment information obtained from a bullet-screen comment database, and store the bullet-screen comment information in a bullet-screen comment recall pool; and a display means, configured to: obtain corresponding bullet-screen comment information from the bullet-screen comment recall pool based on a video identifier of a video viewed by a user of a client and a time period in which the user views the video, perform screening based on a feature algorithm, and display bullet-screen comment information obtained through screening on the client.

An embodiment of this application further provides an electronic apparatus. The electronic apparatus includes a memory, a processor, and a bullet-screen comment processing program stored in the memory and capable of running on the processor. When the bullet-screen comment processing program is executed by the processor, the bullet-screen comment processing method is implemented.

An embodiment of this application further provides a computer-readable storage medium. The computer-readable storage medium stores a bullet-screen comment processing program. When the bullet-screen comment processing program is executed by a processor, the bullet-screen comment processing method is implemented.

BRIEF DESCRIPTION OF DRAWINGS

FIG. 3 is a flowchart of a bullet-screen comment processing method according to some embodiments of this application;

FIG. 6 is a flowchart of a bullet-screen comment processing method according to some embodiments of this application;

FIG. 9 is a schematic diagram of model version control according to some embodiments of this application;

DESCRIPTION OF EMBODIMENTS

To make the objectives, technical solutions, and advantages of this application clearer and more comprehensible, the following further describes this application in detail with reference to the accompanying drawings and the embodiments. It should be understood that the embodiments described herein are merely used to explain this application but are not intended to limit this application. All other embodiments obtained by a person of ordinary skill in the art based on the embodiments of this application without creative efforts shall fall within the protection scope of this application.

It should be noted that the descriptions such as "first" and "second" in the embodiments of this application are merely used for description, and shall not be understood as an indication or implication of relative importance or an implicit indication of a quantity of indicated technical features. Therefore, a feature limited by "first" or "second" may explicitly or implicitly include at least one feature. In addition, technical solutions in the embodiments may be combined with each other, provided that a person of ordinary skill in the art can implement the combination. When the combination of the technical solutions is contradictory or cannot be implemented, it should be considered that the combination of the technical solutions does not exist and does not fall within the protection scope of this application.

Figure 1:
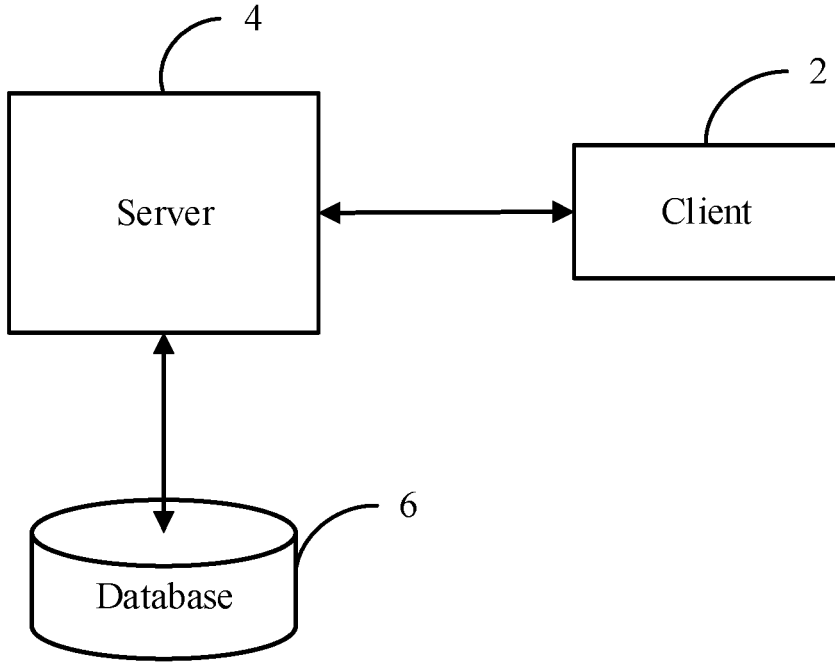
FIG. 1 is an architectural diagram of an application environment for implementing embodiments of this application.

FIG. 1 is an architectural diagram of an application environment for implementing embodiments of this application. This application may be applied to an application environment that includes but is not limited to a client 2, a server 4, and a database 6.

The client 2 is configured to: display an interface of a current application to a user, for example, a video website interface, receive a bullet-screen comment sent by the user, display a corresponding bullet-screen comment to the user when playing a video, and the like. The client 2 may be a terminal device such as a personal computer (PC), a mobile phone, a tablet computer, a portable computer, or a wearable device.

The server 4 is configured to provide data and technical support for the client 2. For example, the server 4 performs model evaluation, pre-ranking, and elimination based on bullet-screen comment information in the database 6, stores bullet-screen comment information in a material pool and an index pool, obtains corresponding bullet-screen comment information from the material pool and the index pool based on a video identifier (ID) of a video viewed by the user and a time period in which the user views the video, performs ranking and extraction, and displays bullet-screen comment information on the client 2. The server 4 may be a computing device such as a rack server, a blade server, a tower server, or a cabinet server, an independent server, or a server cluster including a plurality of servers.

The database 6 includes a relational database for storing full bullet-screen comment information and a key-value (KV) database for storing a bullet-screen comment recall pool. The bullet-screen comment recall pool includes a bullet-screen comment material and a bullet-screen comment index. The relational database may be a TiDB database or any other feasible relational database. Descriptions are provided below by using the TiDB database as an example. The TiDB database is a distributed relational database, supports both online transactional processing and online analytical processing (Hybrid Transactional and Analytical Processing, HTAP), and is suitable for various application scenarios such as high availability, a relatively high requirement for high consistency, and a relatively large data scale. The KV database is a database in which data is stored by using a key-value pair. Each key corresponds to a unique value. For the KV database, a query speed is high, a large amount of data is stored, high concurrency is supported, and it is very suitable to make a query by using a primary key, but a query cannot be made by using a complex condition.

The server 4 is communicatively connected to one or more clients 2 and the database 6 by using a wireless or wired network, to perform data transmission and interaction. The network may be an intranet, the Internet, a global system for mobile communications (GSM), wideband code division multiple access (WCDMA), a 4G network, a 5G network, Bluetooth, Wi-Fi, or the like.

In an existing bullet-screen comment recommendation solution, when a user sends a bullet-screen comment, an engineering system synchronizes the bullet-screen comment to an algorithm system by using a database Binlog. Binlog is a binary log that records all database table structure changes and table data modifications. On a display side, the algorithm system is responsible for calculating a bullet-screen comment ID list to be displayed in a corresponding video, and the engineering system obtains bullet-screen comment content, and finally returns the bullet-screen comment content. In this way, a bullet-screen comment recommendation solution with a basic capability is implemented. However, this solution depends on design of a bullet-screen comment pool, and an upper limit of a quantity of bullet-screen comments that can be displayed in a video is determined based on a length of the video. When the bullet-screen comment pool is full, elimination is performed in a reverse chronological order, and N latest bullet-screen comments are retained. For example, for a video whose length is 15 minutes, the upper limit of the bullet-screen comment pool is 6000.

This design may cause the following problems: Because the upper limit of the bullet-screen comment pool is relatively small, and distribution is uneven, a screen is often not fully filled with bullet-screen comments. In addition, a large quantity of bullet-screen comments of many long videos are concentrated at the beginning of the video, and this part of repeated content occupies a bullet-screen comment pool of the entire video, and consequently there is no bullet-screen comment on the screen for a large part of subsequent content. Because the bullet-screen comment pool is relatively small as a whole, and a candidate set is limited, space for selecting high-quality content is relatively small. In addition, because elimination is performed based on a time sequence, many high-quality historical bullet-screen comments cannot be recalled, and consequently quality of the bullet-screen comment is greatly affected.

To resolve a problem of how to implement personalized bullet-screen comment content recommendation in a scenario with high concurrency, a low delay, high availability, and high stability, the embodiments of this application provide a new bullet-screen comment processing method and system. Design optimization is performed from an overall perspective of combining an engineering system and an algorithm system. Processing effects of a personalized bullet-screen comment recommendation solution are improved in terms of a video segment, a size of a recall pool, index refresh, a calculation amount, exit logic, an experimental capability, and the like. Data consistency and stability are greatly improved, and better bullet-screen comment consumption experience can be brought to a user.

Figure 2:
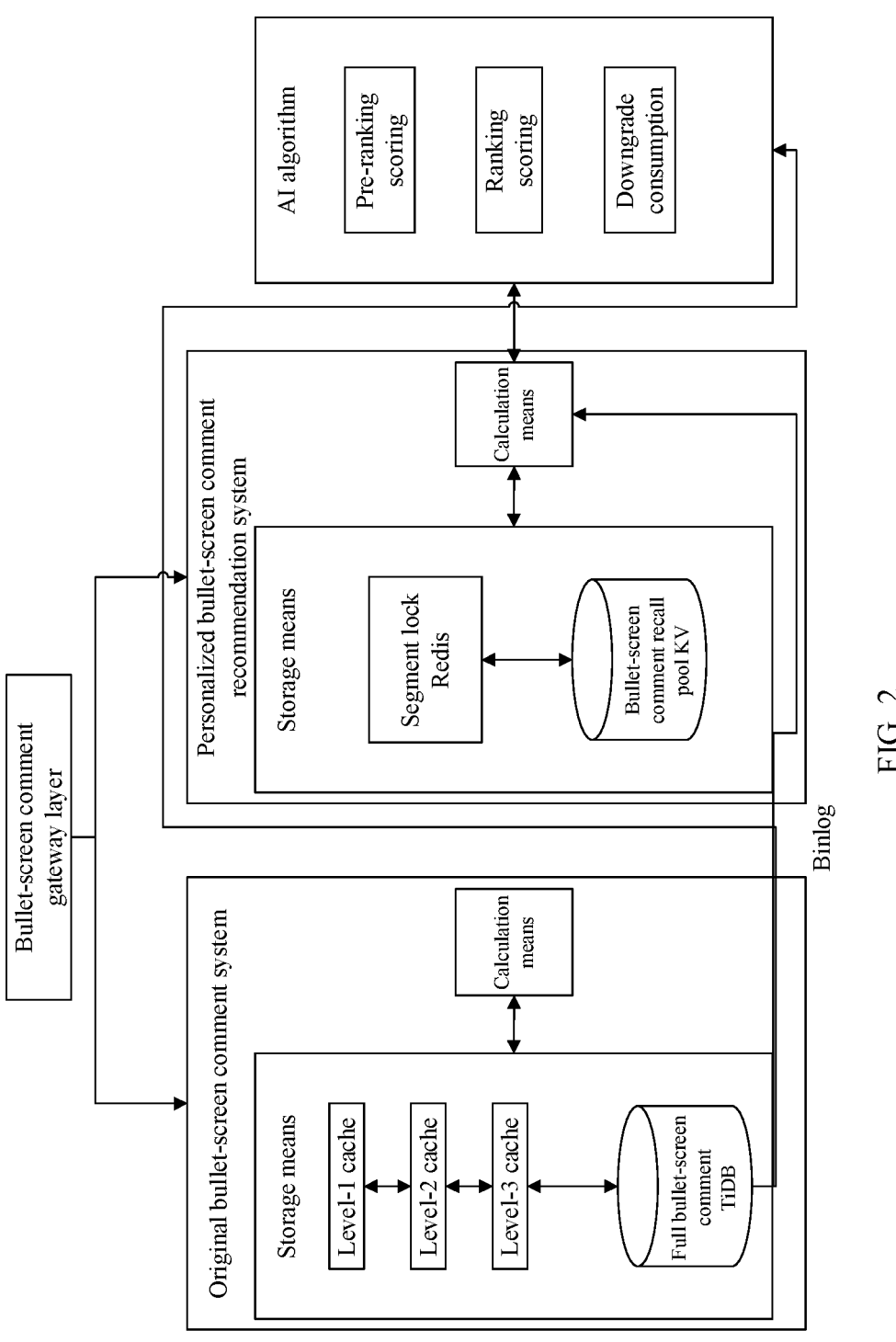
FIG. 2 is a schematic diagram of two systems maintained in an embodiment of this application.

Two core scenarios of bullet-screen comment processing are as follows: When a user sends a bullet-screen comment, a unique ID of a bullet-screen comment dimension is used as a primary key and stored in a database, and a video ID is associated. When a bullet-screen comment needs to be displayed, bullet-screen comment information, for example, all bullet-screen comments of a 6-minute segment of a video, in the database is read at a time by using a video+ segment dimension. In the embodiments of this application, a total of two bullet-screen comment systems need to be maintained. A common problem of maintaining the two systems online is that a responsibility boundary and a relationship are unclear, resulting in gradual confusion during iteration. Therefore, in the embodiments of this application, clear responsibility division and a clear relationship definition are provided for the two systems. FIG. 2 is a schematic diagram of the two systems in an embodiment of this application. One system is an existing bullet-screen comment system (an original bullet-screen comment system in the figure), is mainly configured to be responsible for overall bullet-screen comment service logic, and stores full bullet-screen comment information in a TiDB database. The other system is a new bullet-screen comment processing system (a personalized bullet-screen comment recommendation system in the figure), and is mainly configured to implement a personalized bullet-screen comment recommendation service. In the new system, a KV database is used as a recall pool for personalized recommendation, and is a subset of the TiDB database. In addition, in a main scenario of bullet-screen comment consumption, the original system is maintained in a form of online hot backup. When the new system is faulty, downgrading to the original system can be automatically implemented, so that a user is unaware.

As a core function of a video website, a bullet-screen comment read/write scenario needs to cope with high concurrent traffic and a sudden hot scenario at any time. The original bullet-screen comment system mainly uses a three-level cache structure:

In a level-1 cache, a key is a video ID+segment, and a value is bullet-screen comment content. The level-1 cache is an interface-level cache, and directly receives read traffic of a client 2. In a level-2 cache, a key is a video ID+segment, and a value is a bullet-screen comment ID. The level-2 cache is used to maintain a bullet-screen comment ID list in a bullet-screen comment pool, and create elimination performed in a reverse chronological order. In a level-3 cache, a key is a video ID, a field is a bullet-screen comment ID, and a value is bullet-screen comment content. A data structure is consistent with a database, to reduce retrieval pressure. After a miss (that is, data to be accessed is not hit in the cache) occurs in the level-1 cache, a bullet-screen comment ID list of a current video segment is first obtained by using the level-2 cache, and then bullet-screen comment content is obtained from the level-3 cache. There is a read amplification of a quantity of bullet-screen comments between the level-2 cache and the level-3 cache. If there are 1000 bullet-screen comments in a 6-minute segment of a current video, a 1000× read amplification is generated. If a miss occurs in the level-3 cache, the underlying storage TiDB database is retrieved.

The foregoing storage architecture of the original bullet-screen comment system is relatively complex. Therefore, it is difficult to support a personalized recommendation service requirement in terms of capacity expansion. In addition, it is difficult to change fixed logic that elimination is performed based on a video dimension time sequence. Therefore, in the embodiments of this application, a new personalized bullet-screen comment recommendation system is reconstructed. In the new system, a core link on a display side remains unchanged, a bullet-screen comment ID is still obtained by using a ranking interface of an artificial intelligence (AI) algorithm, and bullet-screen comment content is read from internal storage, and is rendered and returned. A core objective of the new system is to maximize a capacity of the recall pool, while selecting a model-based recall policy and supporting refresh. Therefore, storage needs to be simplified, and a computing capability needs to be improved.

A responsibility boundary of the new system is to meet only a most core scenario of personalized recommendation of a read bullet-screen comment. Therefore, there is no need to store a full bullet-screen comment, and there is no need to support complex service logic and a query capability. Based on such a scenario feature, relational query support may be abandoned. Therefore, the KV database is selected for data storage, and a recalled bullet-screen comment of a video in a first preset time period (for example, 1 minute) is stored in a key. In addition, a single bullet-screen comment is also stored by using a bullet-screen comment ID as a key, and is used to process a bullet-screen comment state or update other metadata. The KV database does not support a transaction. Therefore, data consistency in a concurrent scenario may be ensured by using a remote dictionary server (Redis) distributed lock. Benefiting from a powerful read/write concurrency capability of the KV database, in a scenario with a read amplification, a simplest storage structure that is directly connected to a database and that does not include a cache can still be selected. Experiments show that this storage structure can fully withstand millions of concurrent visits.

In addition, in the personalized bullet-screen comment recommendation system, a concept of segment is used at a plurality of locations to aggregate bullet-screen comment content in a unit video length. This includes the following:

At a display interface layer, if a segment delivered at a time is excessively long, bandwidth is wasted. For example, a 10-minute bullet-screen comment is delivered, and the user exits after viewing for 1 minute. However, if the segment is excessively small, queries per second (QPS) of a server is increased because of request polling. In the embodiments of this application, the server may dynamically deliver a segment size based on an application scenario, to save bandwidth.

Similarly, a main balance point in storage is a request amplification during data reading and a granularity during data update. In the original bullet-screen comment system, if the bullet-screen comment pool is full, elimination is performed in a reverse order based on a time sequence. In the new system, a bullet-screen comment of the video in a second preset time period (for example, every 10 seconds) is selected as a smallest policy unit to perform bullet-screen comment elimination, and recall space of 1000 bullet-screen comments in 10 seconds may be supported. Elimination is performed through scoring based on a pre-ranking model provided by an AI policy, to meet a policy objective, so that there are sufficient bullet-screen comments and the bullet-screen comments are even.

In this architecture, through overall expansion of the storage capacity of the recall pool and improvement of a granularity of a bullet-screen comment elimination policy, the bullet-screen comment recall pool is expanded to approximately 10 times an original size. If the video is 15 minutes, an upper limit of bullet-screen comments in the recall pool is upgraded from 6000 bullet-screen comments for the entire video to 1000 bullet-screen comments for every 10 seconds, and exposure is increased by 30%. This greatly improves consumption experience.

In the personalized bullet-screen comment recommendation system, the engineering system and the algorithm system are deeply combined. The engineering system is used for storing and eliminating a material and an index, and the algorithm system is used for model scoring and policies for pre-ranking and ranking. A function of each part is described in detail in subsequent embodiments. Details are not described herein.

FIG. 3 is a flowchart of a bullet-screen comment processing method according to some embodiments of this application. It may be understood that the flowchart in this method embodiment is not used to limit a step execution order. Some steps in the flowchart may be added or deleted as required. The following describes the method by using an server as an execution body.

The method includes the following steps.

S200: Evaluate, by using a model, bullet-screen comment information obtained from a bullet-screen comment database, and store the bullet-screen comment information in a bullet-screen comment recall pool.

The bullet-screen comment database is a TiDB database in which an original bullet-screen comment system stores full bullet-screen comment information. When a user of a client sends a bullet-screen comment, bullet-screen comment information is transmitted to the original bullet-screen comment system by using a bullet-screen comment gateway layer, and is stored in the bullet-screen comment database. The bullet-screen comment information in the bullet-screen comment database is synchronized to an personalized bullet-screen comment recommendation system by using a database Binlog.

The bullet-screen comment recall pool is a KV database in which the personalized bullet-screen comment recommendation system stores recalled bullet-screen comment information. In the bullet-screen comment recall pool, a recalled bullet-screen comment of a video in a first preset time period (for example, 1 minute) is stored in a key. In this embodiment, a material pool and an index pool are combined in the bullet-screen comment recall pool, to resolve a problem of data misalignment caused by elimination in each of the material pool and the index pool. That is, the bullet-screen comment recall pool includes but is not limited to the material pool, the index pool, and a bullet-screen comment material library. A bullet-screen comment material refers to basic data of a bullet-screen comment, and includes content, a state, like, report, an attribute label, and the like. A bullet-screen comment index refers to an evaluation result (scoring), of the bullet-screen comment, obtained by using all models. All the models include a baseline model (namely, a pre-ranking model), a like model, a report model, a content-related model, and the like, and are mainly used for ranking calculation. For example, there are 15 to 20 groups of model evaluation results for each bullet-screen comment. The material pool refers to a list set of all bullet-screen comment materials in a video segment (for example, 1 minute), and a key is a video ID+segment (minute). The index pool is similar to the material pool, and refers to a list set of all bullet-screen comment indexes in a video segment, and a key is also a video ID+segment (minute). In the bullet-screen comment material library, each piece of bullet-screen comment information is serialized and stored, a bullet-screen comment ID is used as a key, and each piece of bullet-screen comment information is used to process a bullet-screen comment state or update other metadata.

A read/write scenario of the index pool is consistent with that of the material pool. Therefore, a KV database that is the same as that of the material pool may be selected for implementation. In a unit in which a video ID+segment (minute) is used as a key, a pre-ranking evaluation result corresponding to the material pool is ranked and eliminated for storage. It should be noted that the material pool and the index pool are stored by using different keys, and a manner of extending a field based on the material pool is not used for implementation. Core reasons are as follows: A material is consistent with the TiDB database and a bullet-screen comment model in each service scenario, and when the index pool and the material pool are stored by using different keys, coupling of a ranking index and a service function can be avoided. The index and the material can be updated independently, and index refresh costs can be reduced. Gradient downgrading ensures availability, and once an accident index fails, scoring downgrading may be randomly performed to ensure that the user is unaware.

In addition, consistency between the material pool and the index pool is ensured by using a Redis segment lock. A granularity of the Redis segment lock is also a video ID+segment (minute), and is the same as a granularity of the key of the material pool and the index pool. Therefore, when a service is highly concurrent, and online incremental data, the material, and the index are simultaneously refreshed, atomic bullet-screen comment writing is implemented in each minute of the video. In terms of priority, the material pool is predominant. Before the index is written, it is first verified that the material exists. Otherwise, no strong check is performed.

Figure 4:
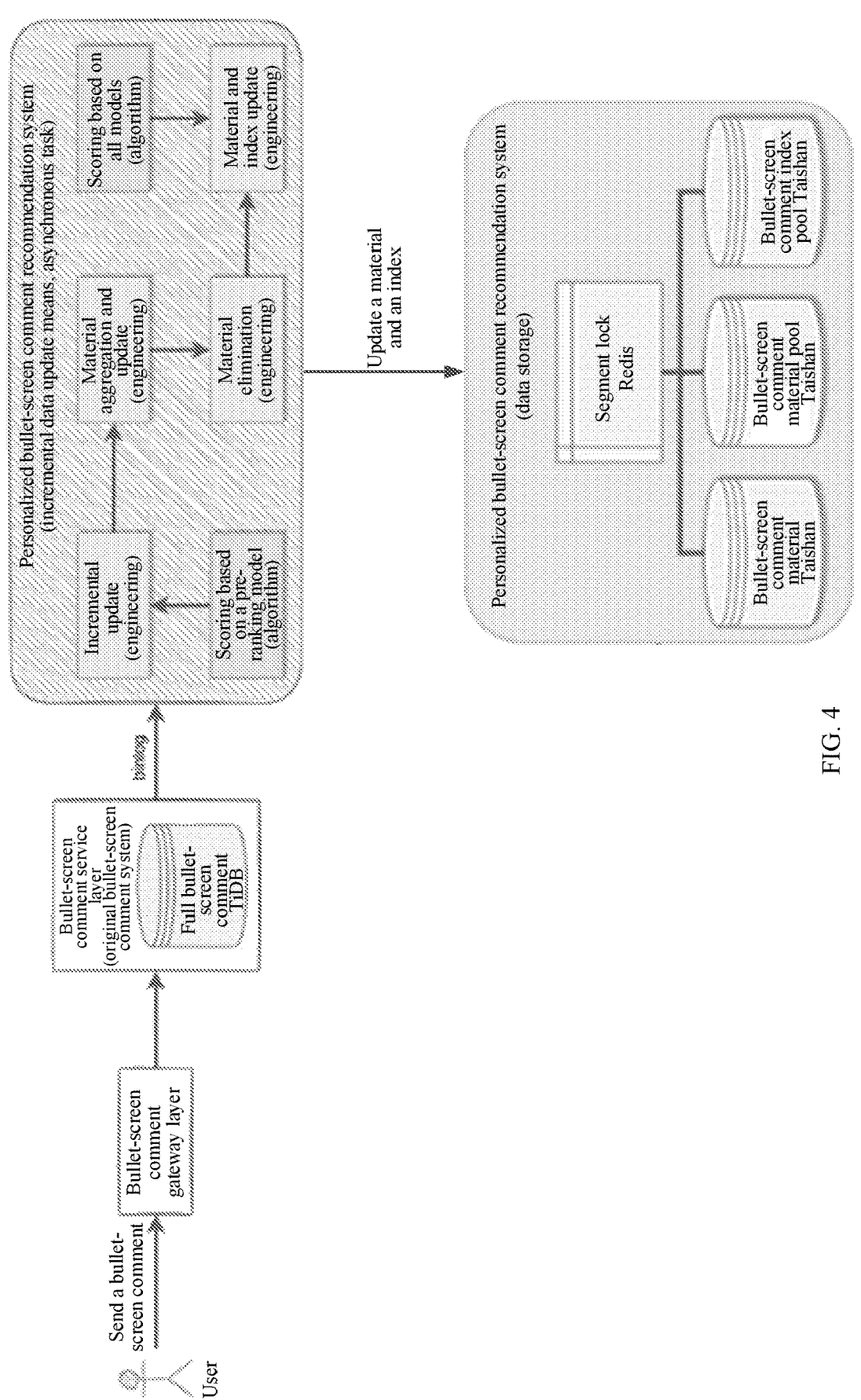
FIG. 4 is a schematic diagram of a bullet-screen comment sending link according to some embodiments of this application.

FIG. 4 is a schematic diagram of a bullet-screen comment sending link in this embodiment. After a bullet-screen comment material is obtained from the bullet-screen comment database, each bullet-screen comment is first evaluated (scored) by using the pre-ranking model, then all bullet-screen comment materials in a second preset time period (for example, every 10 seconds) are aggregated, all bullet-screen comments in the second preset time period are ranked based on an evaluation result, then a bullet-screen comment with a low ranking is eliminated, then an uneliminated bullet-screen comment is evaluated by using all the models, to obtain a bullet-screen comment index, and finally, a material list and an index list are respectively stored in the material pool and the index pool, and a corresponding single piece of bullet-screen comment information is stored in the bullet-screen comment material library. When incremental data is updated, write pressure of the database can be reduced through message queue aggregation.

In the personalized bullet-screen comment recommendation system, calculation costs of model-based reasoning are also an important consideration. If a quantity of redundant reasoning times can be reduced, efficiency of the entire system can be improved, and operation and maintenance costs can be reduced. If a manner of calculating a model evaluation result of a bullet-screen comment is concurrently performing reasoning based on all the models, and if the bullet-screen comment is finally eliminated due to an excessively low pre-ranking score, computational redundancy is caused. Therefore, in this embodiment, evaluation reasoning based on the pre-ranking model is performed first, and then reasoning based on all the models is performed after ranking and elimination are completed, to optimize a calculation amount.

In addition, in this embodiment, exit logic is converged to a pre-ranking phase, and during ranking, data caching does not need to be performed, and only a material and a cache obtained after elimination through pre-ranking need to be read. In this way, an amount of data that needs to be ranked in a ranking phase is greatly reduced, to optimize a response time.

S202: Obtain corresponding bullet-screen comment information from the bullet-screen comment recall pool based on a video ID of a video viewed by a user of a client and a time period in which the user views the video, perform screening based on a feature algorithm, and display bullet-screen comment information obtained through screening on the client.

Figure 5:
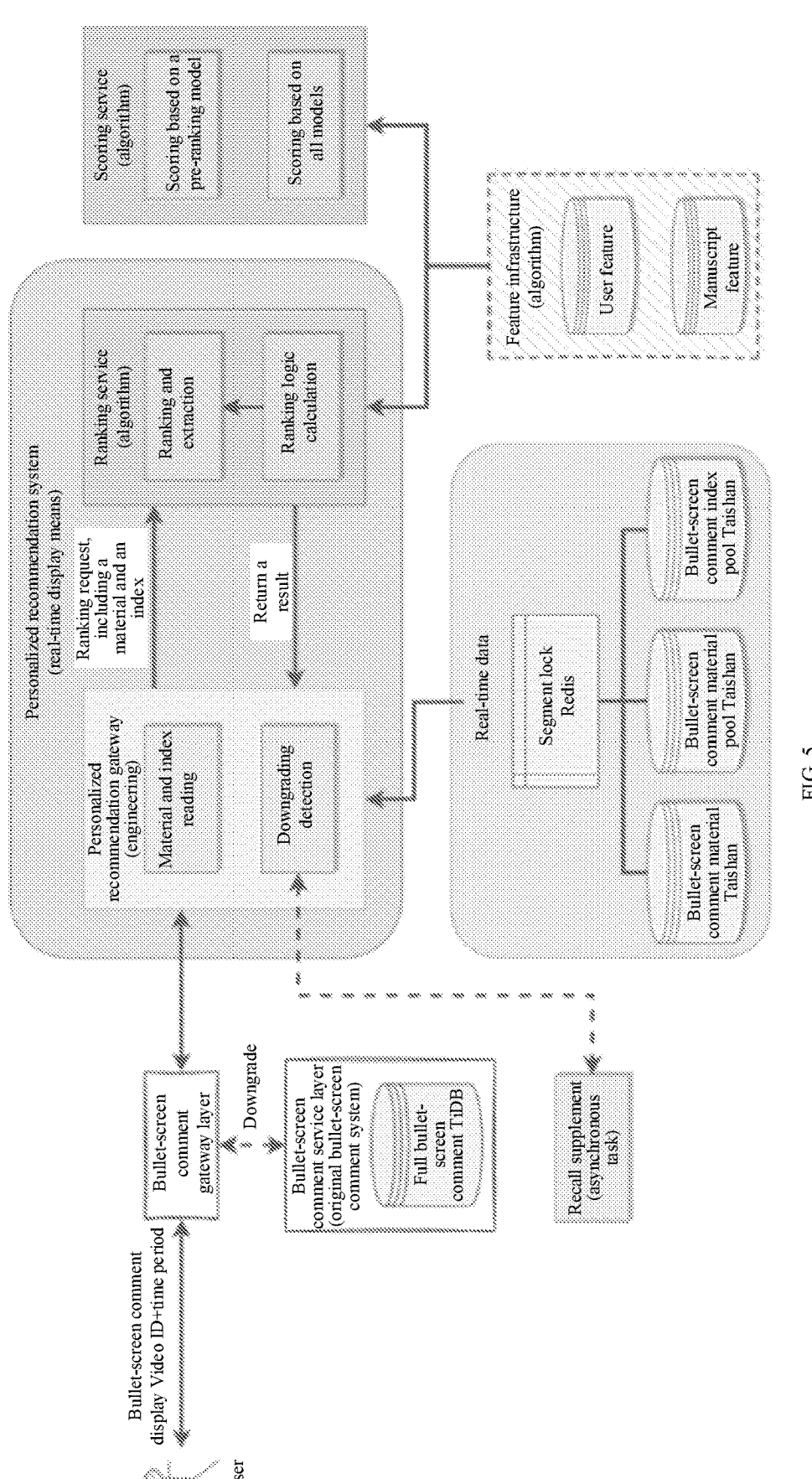
FIG. 5 is a schematic diagram of a bullet-screen comment display link according to some embodiments of this application.

FIG. 5 is a schematic diagram of a bullet-screen comment display link in this embodiment. When the user of the client enables a bullet-screen comment function in a video playing interface, corresponding bullet-screen comment information needs to be displayed when the video is played. Information such as the video ID and the time period in which the user currently views the video is transmitted to the personalized bullet-screen comment recommendation system by using the bullet-screen comment gateway layer, and a personalized recommendation gateway (engineering system) reads a corresponding bullet-screen comment material and index from the bullet-screen comment recall pool based on the video ID and the time period. The time period may be determined based on a video playing time point at which the user currently views the video and a segment size dynamically delivered by the server based on an application scenario, for example, 6 minutes, to avoid waste of network bandwidth. The engineering system may find the corresponding bullet-screen comment material and index from the bullet-screen comment recall pool based on the video ID and each video segment corresponding to the time period, and then send a ranking request to an algorithm system. The algorithm system establishes ranking logic for personalized recommendation based on a preset feature algorithm that includes a user feature and a manuscript (video) feature, evaluates a corresponding bullet-screen comment by using all the models, then performs ranking and extraction (extracts a bullet-screen comment with a high ranking) based on the evaluation result, and returns a recommendation result, namely, bullet-screen comment information that needs to be displayed. The personalized recommendation gateway displays these bullet-screen comments in a display interface of the client through the bullet-screen comment gateway layer.

In addition, the personalized recommendation gateway may further perform downgrading detection. That is, when the personalized bullet-screen comment recommendation system is faulty, downgrading to the original bullet-screen comment system can be automatically implemented, and a bullet-screen comment is displayed based on a result returned by the original bullet-screen comment system, so that a user side of the client is unaware.

According to the bullet-screen comment processing method provided in this embodiment, a solution of deeply combining the engineering system and the algorithm system can be provided. The engineering system is responsible for storing and eliminating a material and an index, and the algorithm system is responsible for model scoring and policies for pre-ranking and ranking. In a scenario with a magnitude of tens of billions of data, high concurrency, and a low delay, personalized interactive content (bullet-screen comment) recommendation is implemented, data consistency and stability are greatly improved, quality of a bullet-screen comment on a screen is optimized, and interaction experience of a user is improved. A downgrading rate during ranking is significantly decreased, and bullet-screen comment exposure is significantly increased when the policy remains unchanged. In addition, by expanding a capacity of the recall pool, quality of a bullet-screen comment on a screen is optimized, and interaction experience of the user is improved. In addition, in this embodiment, a plurality of segment settings are further used to ensure a proper granularity during data update and elimination and save bandwidth, and two bullet-screen comment systems are maintained for online hot backup. When the new system is faulty, downgrading may be automatically performed, so that the user side is unaware.

FIG. 6 is a flowchart of a bullet-screen comment processing method according to some embodiments of this application. In some embodiments, based on some embodiments, the bullet-screen comment processing method further includes steps S304 to S306. It may be understood that the flowchart in this method embodiment is not used to limit a step execution order. Some steps in the flowchart may be added or deleted as required.

The method includes the following steps.

S300: Evaluate, by using a model, bullet-screen comment information obtained from a bullet-screen comment database, and store the bullet-screen comment information in a bullet-screen comment recall pool.

The bullet-screen comment recall pool is a KV database in which a personalized bullet-screen comment recommendation system stores recalled bullet-screen comment information. In the bullet-screen comment recall pool, a recalled bullet-screen comment of a video in a first preset time period (for example, 1 minute) is stored in a key. In this embodiment, the bullet-screen comment recall pool includes but is not limited to a material pool, an index pool, and a bullet-screen comment material library.

After a bullet-screen comment material is obtained from the bullet-screen comment database, each bullet-screen comment is first evaluated by using a pre-ranking model, then all bullet-screen comment materials in a second preset time period (for example, every 10 seconds) are aggregated, all bullet-screen comments in the second preset time period are ranked based on the evaluation result, then a bullet-screen comment with a low ranking is eliminated, then an uneliminated bullet-screen comment is evaluated by using all models, to obtain a bullet-screen comment index, and finally, a material list and an index list are respectively stored in the material pool and the index pool, and a corresponding single piece of bullet-screen comment information is stored in the bullet-screen comment material library.

S302: Obtain corresponding bullet-screen comment information from the bullet-screen comment recall pool based on a video ID of a video viewed by a user of a client and a time period in which the user views the video, perform screening based on a feature algorithm, and display bullet-screen comment information obtained through screening on the client.

When the user of the client enables a bullet-screen comment function in a video playing interface, corresponding bullet-screen comment information needs to be displayed when the video is played. Information such as the video ID and a time point/the time period at/in which the user currently views the video is transmitted to the personalized bullet-screen comment recommendation system by using a bullet-screen comment gateway layer, and a personalized recommendation gateway (engineering system) reads a corresponding bullet-screen comment material and index from the bullet-screen comment recall pool based on the video ID and the time period. The time period may be determined based on a video playing time point at which the user currently views the video and a segment size dynamically delivered by a server based on an application scenario, for example, 6 minutes, to avoid waste of network bandwidth. The engineering system may find the corresponding bullet-screen comment material and index from the bullet-screen comment recall pool based on the video ID and each video segment corresponding to the time period, and then send a ranking request to an algorithm system. The algorithm system establishes ranking logic for personalized recommendation based on a preset feature algorithm that includes a user feature and a manuscript (video) feature, evaluates a corresponding bullet-screen comment by using all the models, then performs ranking and extraction based on the evaluation result, and returns a recommendation result, namely, bullet-screen comment information that needs to be displayed. The personalized recommendation gateway displays these bullet-screen comments in a display interface of the client through the bullet-screen comment gateway layer.

In addition, the personalized recommendation gateway may further perform downgrading detection. That is, when the personalized bullet-screen comment recommendation system is faulty, downgrading to an original bullet-screen comment system can be automatically implemented, and a bullet-screen comment is displayed based on a result returned by the original bullet-screen comment system, so that a user side of the client is unaware.

S304: When the pre-ranking model does not need to be updated, update only a bullet-screen comment index in the bullet-screen comment recall pool through index refresh, to implement model policy iteration.

A refresh link in this embodiment includes index refresh and material refresh. Index refresh is applied to refresh a group (or a plurality of groups) of model evaluation results when recall and pre-ranking policies remain unchanged. Material refresh is applied to recalculate recall, pre-ranking, and elimination by using a full bullet-screen comment when the pre-ranking model is updated. A main scenario that arises in a service is how to quickly support update of a group of model scores outside the pre-ranking model. It takes a very long time to refresh all inventory data. In view of this feature, in this embodiment, index refresh and material refresh are separated, and a difference is whether the pre-ranking model needs to be updated, and whether recall and elimination need to be performed again. In this way, most policy iteration requirements can be met through index refresh, and an overall procedure is reduced. A data write amount can be reduced by half by using a combination with the foregoing design of separately storing the material pool and the index pool.

Figure 7A:
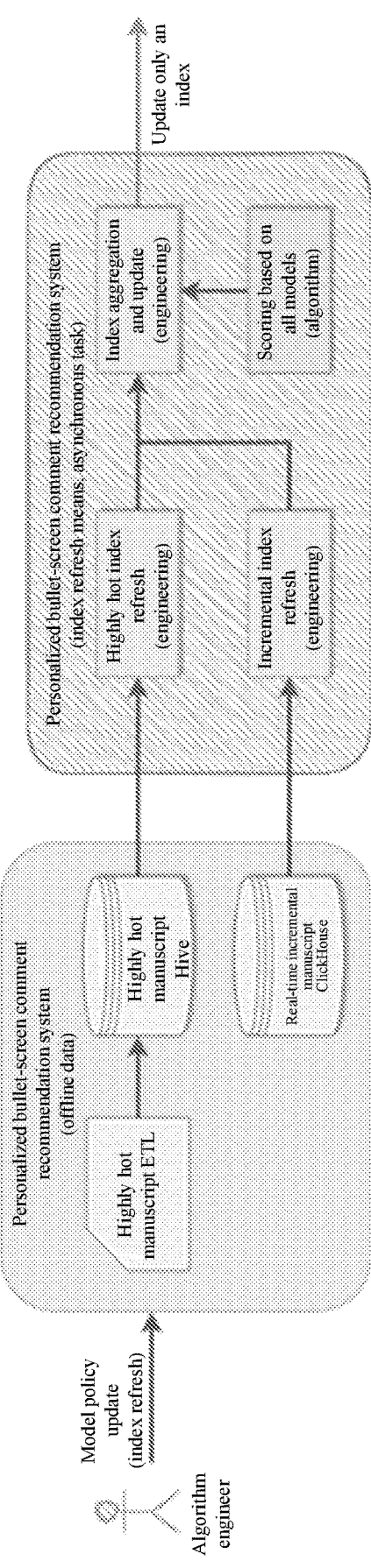
FIG. 7A-7B are schematic diagrams of index refresh according to some embodiments of this application.
Figure 7B:
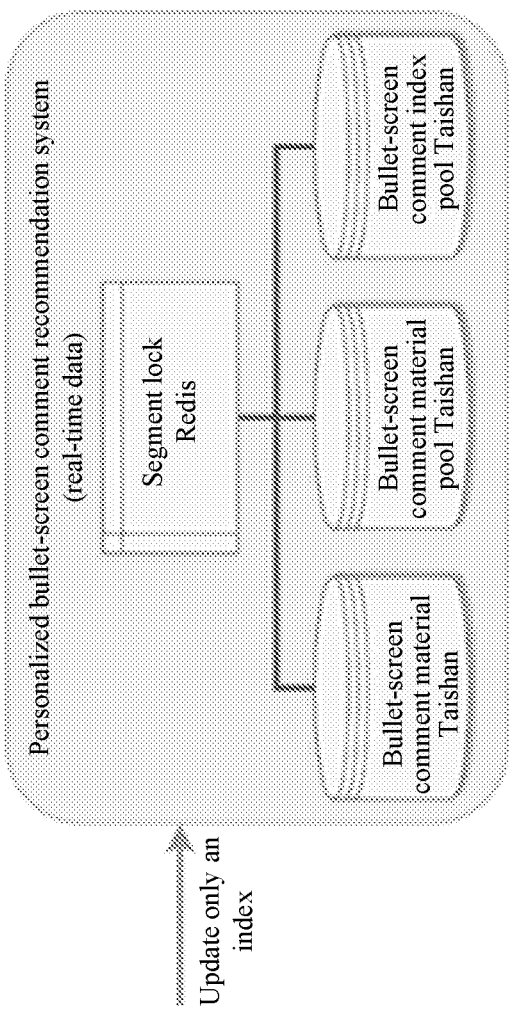

FIG. 7A-7B are schematic diagrams of index refresh in this embodiment. A feature of a bullet-screen comment consumption/display application scenario is that traffic is concentrated in a header manuscript (video). Therefore, as small a quantity of times of data refresh as possible need to be used to cover as large a percentage of visit views (VVs) as possible. In this embodiment, an hourly updated highly hot manuscript (video) table is obtained through calculation by using an extract-transform-load (ETL, a data warehouse technology) task, and then real-time incremental data on a current day is stored by using ClickHouse (a column-oriented storage database). In this way, a complete highly hot video list and a real-time incremental video list may be obtained by combining the highly hot manuscript (video) table and the real-time incremental data. When an index needs to be updated, only a bullet-screen comment corresponding to this part of video needs to be updated. The engineering system refreshes a highly hot index and refreshes an incremental index, and aggregates and updates the two indexes, the algorithm system evaluates a bullet-screen comment corresponding to an aggregated index by using all the models, and obtains a new index based on the evaluation result, and the engineering system updates the new index to the bullet-screen comment recall pool. It should be noted that herein, only the index is updated to the index pool, and no material needs to be updated. In the foregoing manner of separating cold and hot data, 90% of the VVs may be covered by using 15% of the calculation amount. This greatly improves experimental efficiency.

In addition, bullet-screen comments of all videos do not need to be refreshed in some policy iterations. In this case, customized ETL is updated by using a data warehouse and delivered to a data consumer, and policy update can be completed within 1 hour.

S306: When the pre-ranking model needs to be updated, update both a bullet-screen comment material and the index in the bullet-screen comment recall pool through material refresh, to implement model policy iteration.

In the personalized bullet-screen comment recommendation system, once the pre-ranking model is logically updated, the recall pool needs to be refreshed again, that is, material refresh is performed, and recall and elimination are performed again.

Figure 8A:
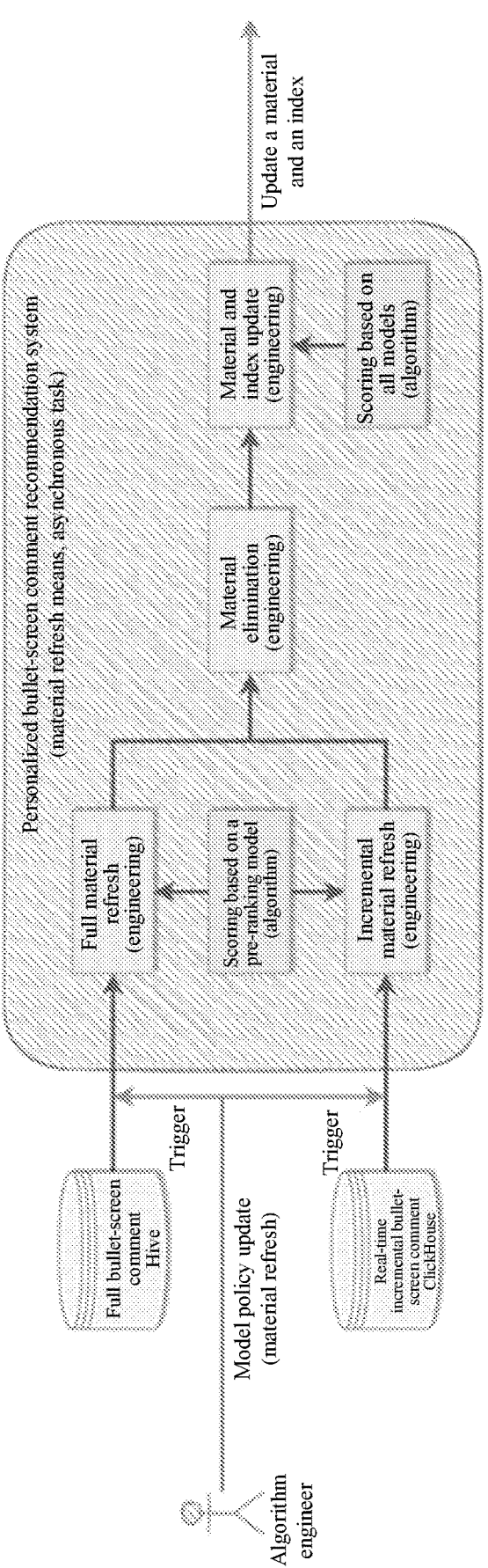
FIG. 8A-8B are schematic diagrams of material refresh according to some embodiments of this application.
Figure 8B:
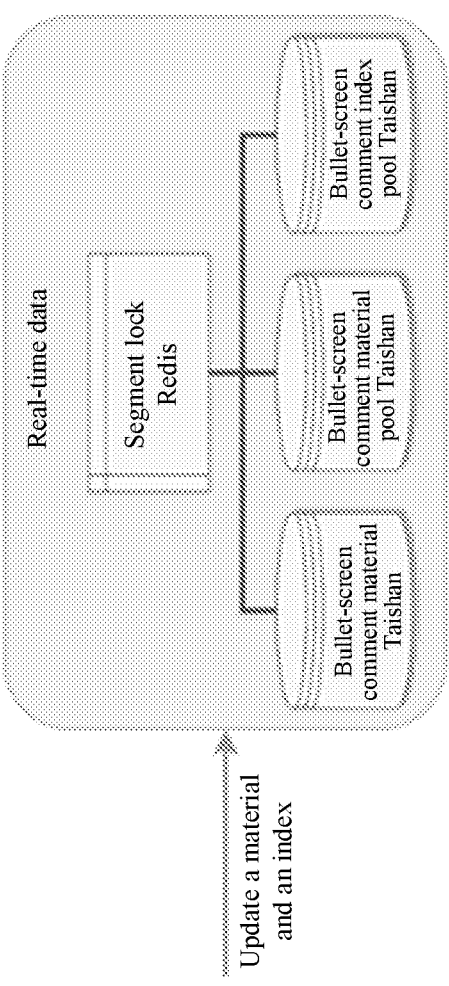

FIG. 8A-8B are schematic diagrams of material refresh in this embodiment. When the pre-ranking model is updated, the personalized bullet-screen comment recommendation system obtains a full bullet-screen comment and a real-time incremental bullet-screen comment, the engineering system refreshes a full material and refreshes an incremental material, the algorithm system evaluates bullet-screen comments corresponding to the full material and the incremental material by using the pre-ranking model, the engineering system eliminates a bullet-screen comment based on the evaluation result, the algorithm system evaluates an uneliminated bullet-screen comment by using all the models, to obtain a new index, and finally, the engineering system updates the material and the index to the bullet-screen comment recall pool.

In addition, in an optional embodiment, a model of the bullet-screen comment index is updated offline. Therefore, if a logical error occurs in a new model, it can be discovered only by using a service indicator grouping exception in a ranking phase. In this case, it is highly likely that data refresh is completed or performed by half. To ensure that model policy iteration in this scenario can be implemented in a gray deployment manner, is observable, and can roll-back, field redundancy and version control of the bullet-screen comment index may be used for implementation.

FIG. 9 is a schematic diagram of model version control in this embodiment. It is assumed that there are currently two models online: a like model and a negative model, and a negative model version needs to be updated this time. In this case, a new version of negative model is updated in a blank field score16, and the old version of negative model score2 is retained. A mapping relationship between model content and a score field is maintained in a ranking service. If the new version of model does not meet expectations, the mapping relationship is updated, and rollback can be completed by using the old version of model field score2. If it is verified online that the new version of model meets expectations, generation of an evaluation result for the old version of model is stopped, and the old version of model field is labeled as blank in the ranking service to complete release.

It is mentioned in the foregoing index refresh step that to support fast experimental policy iteration, model refresh covers most videos instead of all videos. If some cold videos are popular again, a method is needed to find these videos and cover a latest model policy. Therefore, in an optional embodiment, a version, namely, a version field, of the index may be checked in the ranking service. If the version of the index is excessively low, the video ID is pushed to a supplementary recall queue, and all latest model evaluation results are updated. In this way, conversion of cold and hot data is implemented.

According to the bullet-screen comment processing method provided in this embodiment, a solution of deeply combining the engineering system and the algorithm system can be provided. The engineering system is responsible for storing and eliminating a material and an index, and the algorithm system is responsible for model scoring and policies for pre-ranking and ranking. In a scenario with a magnitude of tens of billions of data, high concurrency, and a low delay, personalized interactive content (bullet-screen comment) recommendation is implemented, and data consistency and stability are greatly improved. A downgrading rate during ranking is significantly decreased, and bullet-screen comment exposure is significantly increased when the policy remains unchanged. In addition, by expanding a capacity of the recall pool, quality of a bullet-screen comment on a screen is optimized, and interaction experience of the user is improved. In addition, in this embodiment, index refresh and material refresh are separated. During model policy iteration, if the pre-ranking model is not updated, only index refresh needs to be used. Only when the pre-ranking model is updated, material refresh needs to be used. This can greatly improve data refresh efficiency during policy iteration and improve an experimental capability.

Figure 10:
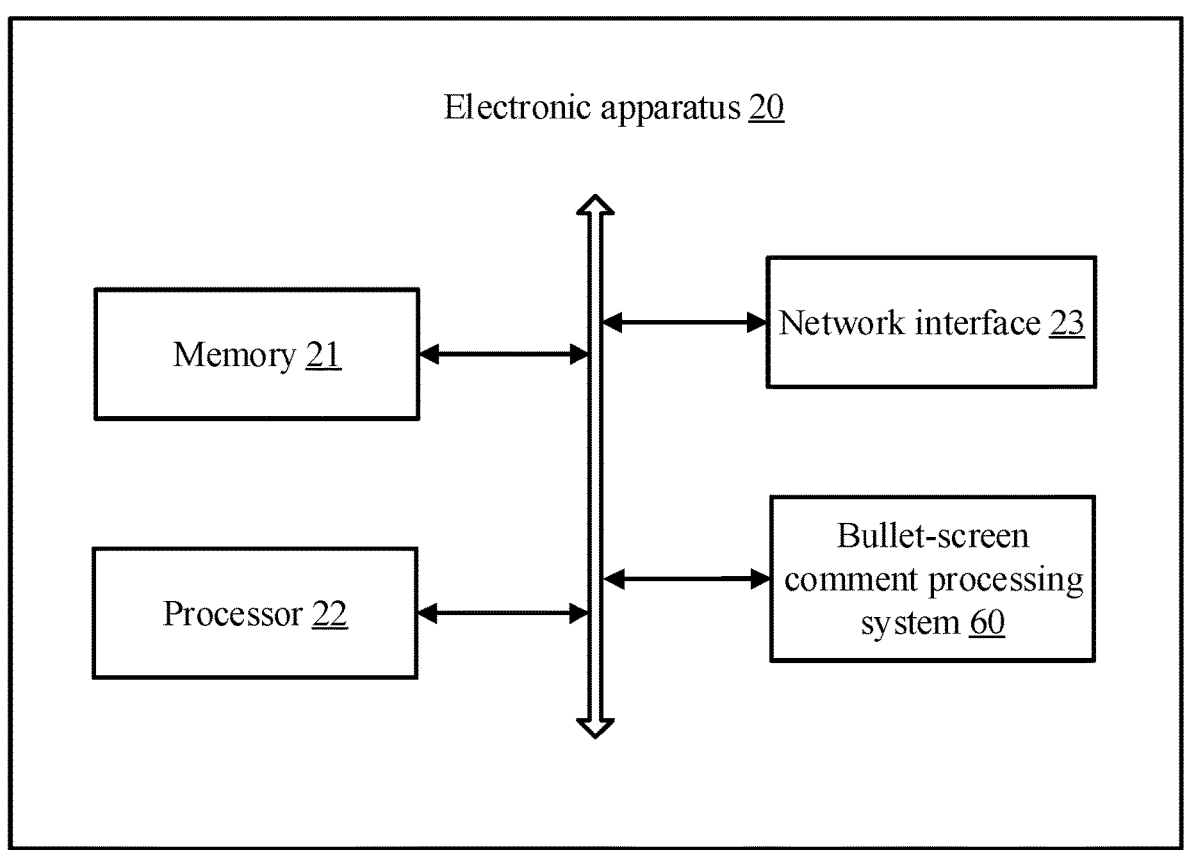
FIG. 10 is a schematic diagram of a hardware architecture of an electronic apparatus according to some embodiments of this application.
Figure 11:
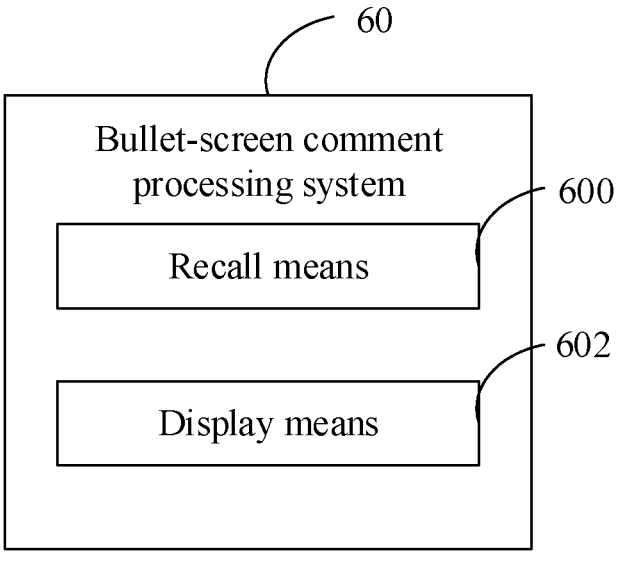
FIG. 11 is a schematic diagram of a means in a bullet-screen comment processing system according to some embodiments of this application.

FIG. 10 is a schematic diagram of a hardware architecture of an electronic apparatus 20 according to some embodiments of this application. In this embodiment, the electronic apparatus 20 may include but is not limited to a memory 21, a processor 22, and a network interface 23 that may be communicatively connected to each other by using a system bus. It should be noted that FIG. 11 shows only an electronic apparatus 20 with the components 21 to 23. However, it should be understood that implementation of all the shown components is not required, and more or fewer components may alternatively be implemented. In this embodiment, the electronic apparatus 20 may be the server.

The memory 21 includes at least one type of readable storage medium. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EE-PROM), a programmable read-only memory (PROM), a magnetic memory, a magnetic disk, an optical disc, and the like. In some embodiments, the memory 21 may be an internal storage unit of the electronic apparatus 20, for example, a hard disk or a memory of the electronic apparatus 20. In some other embodiments, the memory 21 may be an external storage device of the electronic apparatus 20, for example, a removable hard disk, a smart media card (SMC), a secure digital (SD) card, or a flash card that is disposed on the electronic apparatus 20. Certainly, the memory 21 may include both an internal storage unit of the electronic apparatus 20 and an external storage device of the electronic apparatus 20. In this embodiment, the memory 21 is usually configured to store an operating system and various types of application software that are installed in the electronic apparatus 20, for example, program code of a bullet-screen comment processing system 60. In addition, the memory 21 may be further configured to temporarily store various types of data that have been output or are to be output.

The processor 22 may be a central processing unit (CPU), a controller, a microcontroller, a microprocessor, or another data processing chip in some embodiments. The processor 22 is usually configured to control an overall operation of the electronic apparatus 20. In this embodiment, the processor 22 is configured to run the program code stored in the memory 21 or process data, for example, run the bullet-screen comment processing system 60.

The network interface 23 may include a wireless network interface or a wired network interface, and the network interface 23 is usually configured to establish a communication connection between the electronic apparatus 20 and another electronic device.

FIG. 11 is a schematic diagram of a means in a bullet-screen comment processing system 60 according to some embodiments of this application. The bullet-screen comment processing system 60 may be divided into one or more program means. The one or more program means are stored in a storage medium and executed by one or more processors, to complete this embodiment of this application. The program means in this embodiment of this application is a series of computer program instruction segments that can be used to complete a function. The following describes in detail a function of each program means in this embodiment.

In this embodiment, the bullet-screen comment processing system 60 includes a recall means 600 and a display means 602.

The recall means 600 is configured to: evaluate, by using a model, bullet-screen comment information obtained from a bullet-screen comment database, and store the bullet-screen comment information in a bullet-screen comment recall pool.

The bullet-screen comment recall pool is a KV database in which the bullet-screen comment processing system 60 stores recalled bullet-screen comment information. In the bullet-screen comment recall pool, a recalled bullet-screen comment of a video in a first preset time period (for example, 1 minute) is stored in a key. In this embodiment, the bullet-screen comment recall pool includes but is not limited to a material pool, an index pool, and a bullet-screen comment material library.

After a bullet-screen comment material is obtained from the bullet-screen comment database, each bullet-screen comment is first evaluated by using a pre-ranking model, then all bullet-screen comment materials in a second preset time period (for example, every 10 seconds) are aggregated, all bullet-screen comments in the second preset time period are ranked based on the evaluation result, then a bullet-screen comment with a low ranking is eliminated, then an uneliminated bullet-screen comment is evaluated by using all models, to obtain a bullet-screen comment index, and finally, a material list and an index list are respectively stored in the material pool and the index pool, and a corresponding single piece of bullet-screen comment information is stored in the bullet-screen comment material library.

The display means 602 is configured to: obtain corresponding bullet-screen comment information from the bullet-screen comment recall pool based on a video ID of a video viewed by a user of a client and a time period in which the user views the video, perform screening based on a feature algorithm, and display bullet-screen comment information obtained through screening on the client.

When the user of the client enables a bullet-screen comment function in a video playing interface, corresponding bullet-screen comment information needs to be displayed when the video is played. Information such as the video ID and the time period in which the user currently views the video is transmitted to the bullet-screen comment processing system 60 by using a bullet-screen comment gateway layer.

The display means 602 reads a corresponding bullet-screen comment material and index from the bullet-screen comment recall pool based on the video ID and the time period. The time period may be determined based on a video playing time point at which the user currently views the video and a segment size dynamically delivered by a server based on an application scenario, for example, 6 minutes, to avoid waste of network bandwidth. The corresponding bullet-screen comment material and index may be found from the bullet-screen comment recall pool based on the video ID and each video segment corresponding to the time period. Then, ranking logic for personalized recommendation is established based on a preset feature algorithm that includes a user feature and a manuscript (video) feature, and a corresponding bullet-screen comment is evaluated by using all the models. Then, ranking and extraction are performed based on the evaluation result, and a recommendation result, namely, bullet-screen comment information that needs to be displayed, is returned, and these bullet-screen comments are displayed in a display interface of the client through the bullet-screen comment gateway layer.

Figure 12:
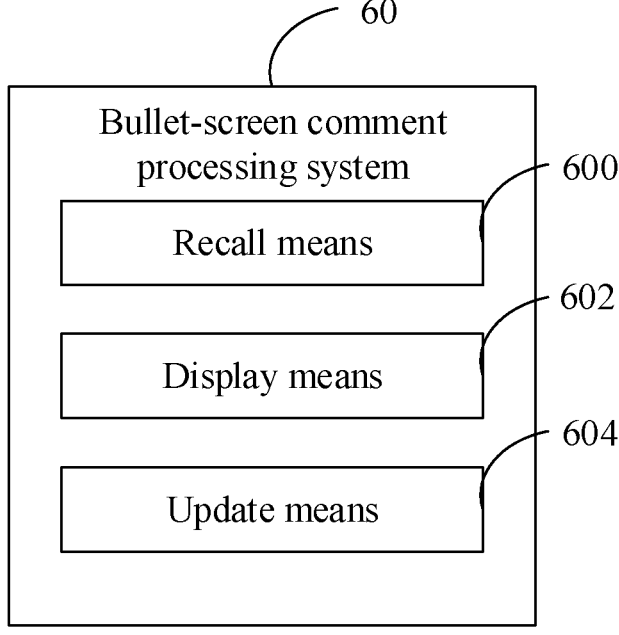
FIG. 12 is a schematic diagram of a means in a bullet-screen comment processing system according to some embodiments of this application.

FIG. 12 is a schematic diagram of a means in a bullet-screen comment processing system 60 according to some embodiments of this application. In this embodiment, in addition to the recall means 600 and the display means 602 in some embodiments, the bullet-screen comment processing system 60 further includes an update means 604.

The update means 604 is configured to: when a pre-ranking model does not need to be updated, update only a bullet-screen comment index in the bullet-screen comment recall pool through index refresh, to implement model policy iteration.

A refresh link in this embodiment includes index refresh and material refresh. Index refresh is applied to refresh a group (or a plurality of groups) of model evaluation results when recall and pre-ranking policies remain unchanged. Material refresh is applied to recalculate recall, pre-ranking, and elimination by using a full bullet-screen comment when the pre-ranking model is updated. A main scenario that arises in a service is how to quickly support update of a group of model scores outside the pre-ranking model. It takes a very long time to refresh all inventory data. In view of this feature, in this embodiment, index refresh and material refresh are separated, and a difference is whether the pre-ranking model needs to be updated, and whether recall and elimination need to be performed again. In this way, most policy iteration requirements can be met through index refresh, and an overall procedure is reduced. A data write amount can be reduced by half by using a combination with the foregoing design of separately storing the material pool and the index pool.

A feature of a bullet-screen comment consumption/display application scenario is that traffic is concentrated in a header manuscript (video). Therefore, as small a quantity of times of data refresh as possible need to be used to cover as large a percentage of VVs as possible. In this embodiment, an hourly updated highly hot manuscript (video) table is obtained through calculation by using an ETL task, and then real-time incremental data on a current day is stored by using ClickHouse. In this way, a complete highly hot video list and a real-time video list may be obtained by combining the highly hot manuscript (video) table and the real-time incremental data. When an index needs to be updated, only a bullet-screen comment corresponding to this part of video needs to be updated. The update means 604 refreshes a highly hot index and refreshes an incremental index, aggregates and updates the two indexes, evaluates a bullet-screen comment corresponding to an aggregated index by using all the models, obtains a new index based on the evaluation result, and updates the new index to the bullet-screen comment recall pool. It should be noted that herein, only the index is updated to the index pool, and no material needs to be updated. In the foregoing manner of separating cold and hot data, 90% of the VVs may be covered by using 15% of the calculation amount. This greatly improves experimental efficiency.

In addition, bullet-screen comments of all videos do not need to be refreshed in some policy iterations. In this case, customized ETL is updated by using a data warehouse and delivered to a data consumer, and policy update can be completed within 1 hour.

The update means 604 is further configured to: when the pre-ranking model needs to be updated, update both a bullet-screen comment material and the index in the bullet-screen comment recall pool through material refresh, to implement model policy iteration.

When the pre-ranking model is updated, the recall pool needs to be refreshed again, that is, material refresh is performed, and recall and elimination are performed again. The update means 604 obtains a full bullet-screen comment and a real-time incremental bullet-screen comment, refreshes a full material and refreshes an incremental material, evaluates bullet-screen comments corresponding to the full material and the incremental material by using the pre-ranking model, eliminates some bullet-screen comments based on the evaluation result, evaluates an uneliminated bullet-screen comment by using all the models, to obtain a new index, and finally, updates the material and the index to the bullet-screen comment recall pool.

This application further provides another implementation, that is, provides a computer-readable storage medium. The computer-readable storage medium stores a bullet-screen comment processing program. The bullet-screen comment processing program may be executed by at least one processor, so that the at least one processor performs the steps of the bullet-screen comment processing method.

It should be noted that in this specification, the term "include", "comprise", or any other variant thereof is intended to cover non-exclusive inclusion, so that a process, method, article, or apparatus that includes a series of elements includes those elements and other elements that are not explicitly listed or elements inherent to the process, method, article, or apparatus. In the absence of more restrictions, the element defined by the statement "includes one . . . " does not exclude the existence of another identical element in the process, method, article, or apparatus that includes the element.

The sequence numbers of the foregoing embodiments of this application are merely for illustrative purposes, and are not intended to indicate priorities of the embodiments.

Clearly, a person skilled in the art should understand that the foregoing means or steps in the embodiments of this application may be implemented by using a general computing apparatus. The means or steps may be integrated into a single computing apparatus or distributed in a network including a plurality of computing apparatuses. Optionally, the means or steps may be implemented by using program code that can be executed by the computing apparatus. Therefore, the means or steps may be stored in a storage apparatus for execution by the computing apparatus. In addition, in some cases, the shown or described steps may be performed in an order different from the order herein. Alternatively, the means or steps may be separately made into integrated circuit means, or a plurality of means or steps in the means or steps are made into a single integrated circuit means for implementation. In this way, a combination of any hardware and software is not limited in the embodiments of this application.

The foregoing descriptions are merely exemplary embodiments in the embodiments of this application, and are not intended to limit the scope of the embodiments of this application. Any equivalent structure or equivalent procedure change made by using the content of the specification and the accompanying drawings of the embodiments of this application, or when directly or indirectly applied to other related technical fields shall fall within the protection scope of the embodiments of this application.

What is claimed is:

1. A method, comprising:

evaluating, by using a model, bullet-screen comment information obtained from a bullet-screen comment database, and storing the bullet-screen comment information in a bullet-screen comment recall pool, comprising:

obtaining a bullet-screen comment material from the bullet-screen comment database, and evaluating each bullet-screen comment by using a pre-ranking model;

aggregating all bullet-screen comment materials in a second preset time period, and performing ranking and elimination on all bullet-screen comments in the second preset time period based on an evaluation result;

evaluating an uneliminated bullet-screen comment by using all models, and obtaining a bullet-screen comment index based on an evaluation result; and respectively storing a material list and an index list of the uneliminated bullet-screen comment in a material pool and an index pool of the bullet-screen comment recall pool, wherein the material pool is used to store a bullet-screen comment material that is basic data of a bullet-screen comment, and the index pool is used to store a bullet-screen comment index that is a model evaluation result of each bullet-screen comment corresponding to the material pool; and obtaining corresponding bullet-screen comment information from the bullet-screen comment recall pool based on a video identifier of a video viewed by a user of a client and a time period in which the user views the video, performing screening based on a feature algorithm, and displaying bullet-screen comment information obtained through screening on the client.

2. The method according to claim 1, further comprising:

in response to that a pre-ranking model does not need to be updated, updating only the bullet-screen comment index in the bullet-screen comment recall pool through index refresh, to implement model policy iteration.

3. The method according to claim 2, wherein the index refresh comprises:

obtaining a highly hot video list and a real-time incremental video list;

evaluating bullet-screen comments corresponding to the highly hot video list and the real-time incremental video list by using all models; and obtaining a new index based on an evaluation result, and updating the new index to the bullet-screen comment recall pool.

4. The method according to claim 1, further comprising:

in response to that a pre-ranking model needs to be updated, updating both the bullet-screen comment material and the index in the bullet-screen comment recall pool through material refresh, to implement model policy iteration.

5. The method according to claim 4, wherein the material refresh comprises:

obtaining a full bullet-screen comment and a real-time incremental bullet-screen comment;

evaluating the full bullet-screen comment and the real-time incremental bullet-screen comment by using the pre-ranking model;

performing ranking and elimination on a bullet-screen comment based on an evaluation result, and evaluating an uneliminated bullet-screen comment by using all models, to obtain a new index; and updating a material and the new index of the uneliminated bullet-screen comment to the bullet-screen comment recall pool.

6. The method according to claim 1, wherein the bullet-screen comment recall pool is a key-value database, and a recalled bullet-screen comment of a video in a first preset time period is stored in a value corresponding to a key.

7. The method according to claim 1, wherein the material pool and the index pool are separately stored in the bullet-screen comment recall pool by using different keys, and data consistency is ensured by using a Redis segment lock.

8. The method according to claim 1, wherein the time period is determined based on a video playing time point at which the user currently views the video and a segment size dynamically delivered by a server based on an application scenario.

9. The method according to claim 1, wherein the performing screening based on a feature algorithm comprises:

establishing ranking logic for personalized recommendation based on a preset feature algorithm that comprises a user feature and a video feature, evaluating a corresponding bullet-screen comment by using all models, then performing ranking and extraction based on an evaluation result, and returning a recommendation result.

10. An electronic apparatus, wherein the electronic apparatus comprises a memory, a processor, and computer-readable instructions stored in the memory and capable of running on the processor, and when the computer-readable instructions are executed by the processor, the processor performs operations comprising:

evaluating, by using a model, bullet-screen comment information obtained from a bullet-screen comment database, and storing the bullet-screen comment information in a bullet-screen comment recall pool, comprising:

obtaining a bullet-screen comment material from the bullet-screen comment database, and evaluating each bullet-screen comment by using a pre-ranking model;

aggregating all bullet-screen comment materials in a second preset time period, and performing ranking and elimination on all bullet-screen comments in the second preset time period based on an evaluation result;

evaluating an uneliminated bullet-screen comment by using all models, and obtaining a bullet-screen comment index based on an evaluation result; and respectively storing a material list and an index list of the uneliminated bullet-screen comment in a material pool and an index pool of the bullet-screen comment recall pool, wherein the material pool is used to store a bullet-screen comment material that is basic data of a bullet-screen comment, and the index pool is used to store a bullet-screen comment index that is a model evaluation result of each bullet-screen comment corresponding to the material pool; and obtaining corresponding bullet-screen comment information from the bullet-screen comment recall pool based on a video identifier of a video viewed by a user of a client and a time period in which the user views the video, performing screening based on a feature algorithm, and displaying bullet-screen comment information obtained through screening on the client.

11. The electronic apparatus according to claim 10, wherein the operations performed by the processor further comprises:

in response to that a pre-ranking model does not need to be updated, updating only the bullet-screen comment index in the bullet-screen comment recall pool through index refresh, to implement model policy iteration.

12. The electronic apparatus according to claim 10, wherein the operations performed by the processor further comprises:

in response to that a pre-ranking model needs to be updated, updating both the bullet-screen comment material and the index in the bullet-screen comment recall pool through material refresh, to implement model policy iteration.

13. The electronic apparatus according to claim 10, wherein the bullet-screen comment recall pool is a key-value database, and a recalled bullet-screen comment of a video in a first preset time period is stored in a value corresponding to a key.

14. A non-transitory computer-readable storage medium, wherein the computer-readable storage medium stores computer-readable instructions, and when the computer-readable instructions are executed by a processor, the processor performs operations comprising:

evaluating, by using a model, bullet-screen comment information obtained from a bullet-screen comment database, and storing the bullet-screen comment information in a bullet-screen comment recall pool, comprising:

obtaining a bullet-screen comment material from the bullet-screen comment database, and evaluating each bullet-screen comment by using a pre-ranking model;

aggregating all bullet-screen comment materials in a second preset time period, and performing ranking and elimination on all bullet-screen comments in the second preset time period based on an evaluation result;

evaluating an uneliminated bullet-screen comment by using all models, and obtaining a bullet-screen comment index based on an evaluation result; and respectively storing a material list and an index list of the uneliminated bullet-screen comment in a material pool and an index pool of the bullet-screen comment recall pool, wherein the material pool is used to store a bullet-screen comment material that is basic data of a bullet-screen comment, and the index pool is used to store a bullet-screen comment index that is a model evaluation result of each bullet-screen comment corresponding to the material pool; and obtaining corresponding bullet-screen comment information from the bullet-screen comment recall pool based on a video identifier of a video viewed by a user of a client and a time period in which the user views the video, performing screening based on a feature algorithm, and displaying bullet-screen comment information obtained through screening on the client.

15. The non-transitory computer-readable storage medium according to claim 14, wherein the operations performed by the processor further comprises:

in response to that a pre-ranking model does not need to be updated, updating only the bullet-screen comment index in the bullet-screen comment recall pool through index refresh, to implement model policy iteration.

16. The non-transitory computer-readable storage medium according to claim 14, wherein the operations performed by the processor further comprises:

in response to that a pre-ranking model needs to be updated, updating both the bullet-screen comment material and the index in the bullet-screen comment recall pool through material refresh, to implement model policy iteration.

\* \* \* \* \*